(12) United States Patent
Schlagenhaft

(10) Patent No.: US 6,244,395 B1
(45) Date of Patent: Jun. 12, 2001

(54) ELECTROMAGNETIC HYSTERESIS BRAKE, ESPECIALLY AS A YARN BRAKE FOR TEXTILE MACHINES

(75) Inventor: Walter Schlagenhaft, Kempten (DE)

(73) Assignee: Saurer-Allma GmbH, Kempten (DE)

( * ) Notice: Subject to any disclaimer, the term of this patent is extended or adjusted under 35 U.S.C. 154(b) by 0 days.

(21) Appl. No.: 09/229,619

(22) Filed: Jan. 13, 1999

(30) Foreign Application Priority Data

Jan. 16, 1998 (DE) .............................................. 198 01 334

(51) Int. Cl.[7] ...................................................... B60L 7/00
(52) U.S. Cl. .......................... 188/161; 188/164; 188/158; 310/103
(58) Field of Search ..................... 188/161, 164, 188/71.5, 72.3, 163, 72.1, 158, 171, 267; 192/84.1, 84.3, 84.31; 310/103, 105, 92

(56) References Cited

U.S. PATENT DOCUMENTS

| 2,765,878 | * | 10/1956 | Pierce | 188/164 |
| 3,512,618 | * | 5/1970 | Schafer | 188/161 |
| 4,560,895 | * | 12/1985 | Zahner | 310/77 |
| 4,594,844 | * | 6/1986 | Muzila | 57/88 |
| 5,121,018 | * | 6/1992 | Oldakowski | 188/161 |
| 5,238,095 | * | 8/1993 | Pedu | 188/267 |
| 5,490,583 | * | 2/1996 | Anderson et al. | 188/161 |
| 5,873,436 | * | 2/1999 | Schneider | 188/158 |

FOREIGN PATENT DOCUMENTS

| 1 613 034 | 4/1971 | (DE) . |
| 3 628 285 | 3/1987 | (DE) . |
| 4 424 457 | 1/1996 | (DE) . |

* cited by examiner

*Primary Examiner*—Robert J. Oberleitner
*Assistant Examiner*—Mariano Sy
(74) *Attorney, Agent, or Firm*—Flynn, Thiel, Boutell & Tanis, P.C.

(57) ABSTRACT

The electromagnetic hysteresis brake, especially a yarn brake for textile machines, comprises a stationary brake magnet (1), which consists of inner and outer pole ring parts (2, 3) and a magnet winding (4), and a rotating armature (8), which is connected to a hysteresis ring (7) of permanent magnetic material. The hysteresis ring (7) projects into an annular air-gap (6) of the brake magnet (1), which is formed between the inner and outer pole ring parts (2, 3). At least one permanent magnet (5) is so arranged adjacent the magnet winding (4) that the magnetic field in the air-gap (6) is formed by cooperation of the magnetic fluxes of the electromagnet (4) and the permanent magnet (5). The magnetic flux of the electromagnet (4) can be adjusted in magnitude and direction in the gap by corresponding poling that it assists or counteracts the magnetic flux of the permanent magnet.

20 Claims, 3 Drawing Sheets

ELECTROMAGNETIC HYSTERESIS BRAKE, ESPECIALLY AS A YARN BRAKE FOR TEXTILE MACHINES

FIELD OF THE INVENTION

The present invention relates to an electromagnetic hysteresis brake, especially as a yarn brake for textile machines, with a stationary brake magnet having an inner and an outer pole ring part and a magnet winding, and with a rotating armature, which is attached to a hysteresis ring of permanent magnetic material, wherein the hysteresis ring projects into an annular air-gap of the brake magnet, which is formed between the inner and outer pole ring parts.

BACKGROUND OF THE INVENTION

Known hysteresis brakes (DE 4 424 457 A1) are used as yarn brakes in textile machines for example. The feature typical of such machines is a plurality of production units which are arranged in a row and run the same processing cycle in parallel. The individual yarn brakes are under central electrical control, in that current from a DC voltage source is applied to the magnet windings of the hysteresis brakes. The braking moment is provided exclusively by the magnetic flux created by the electromagnetic winding in the air-gap, which is dependent on the current applied to the winding at the time. If there is no current, there is no magnetic flux and the braking moment created by the previously known hysteresis brake would be equal to zero in this case. This means that the yarn has no tension when using the hysteresis brake as a yarn brake, should the current supply fail.

This can have fatal results in textile machines. The yarns of all spindles lose tension. If in ply twisting for example the yarn brake of the outer yarn lacks braking moment, yarn will be drawn out of the creel until the yarn is completely lacking tension. On account of the twist imparted by the twisting or ply twisting process, the yarns have an internal torsional moment. If there is no longer any yarn tension, this leads to the formation of loops. These can no longer be stretched out as the machine runs on. An unacceptable fault develops in the finished product. In order to avoid such faults, the textile machine has to be completely cleared down and set up again. Half-finished spools cannot be further processed as a rule. Also the remainders of the supply spools not yet processed create problems. As well as the high costs of unusable casualty spools of ply and supply material, high down times of the textile machines result. In order to counter these problems caused by loss of current, the textile machines are equipped with an emergency current supply from batteries. The demands of space, cost and servicing this emergency current supply are however substantial. Moreover the emergency current supply and thus the braking moment only lasts until the capacity of the batteries is exhausted which is normally the case after about 20 minutes.

SUMMARY OF THE INVENTION

The invention is based on the object of providing an electromagnet hysteresis brake, especially as a yarn brake for textile machines, wherein a sufficiently large braking moment is available in the case of loss of current, even without an emergency current supply.

This achieved according to the invention in that at least one permanent magnet is so arranged in shunt with the magnetic circuit of the magnet winding, that the magnetic field in the air-gap is formed by cooperation of the magnetic fluxes of the electromagnet (magnet winding) and the permanent magnet, and in that the magnetic flux of the electromagnet is so adjustable in magnitude and direction in the gap by corresponding poling that it assists or counteracts the magnetic flux of the permanent magnet.

The invention thus develops from the concept of creating the magnetic flux in the air-gap in part by the magnet winding of electromagnet and in part by the permanent magnet and superimposing the magnetic fields created by the electromagnet and by the permanent magnet. By suitable adjustment of the current applied to the electromagnet the superimposition can be so effected in the region of the hysteresis ring that the total magnetic flux in the gap tends to zero or is only used in part or is completely aligned in parallel in the gap.

By suitable current control of the electromagnet it is thus possible to adjust the hysteresis brake to any desired torque between 0 and 100%. Furthermore, on loss of current, the electromagnet does indeed become ineffective, but a magnetic field remains indefinitely through the permanent magnet, which is fully enough to generate a sufficiently high braking moment while the machine runs or when it stops. The braking force for keeping the yarn taut in the case of loss of current is insignificant; a small braking moment is already sufficient since it does not have to work against the yarn tensions during the production process. This means that only a braking moment of at least 20% has to be available, which is easily achieved by the permanent magnet. It is thus possible to dispense with an emergency current supply entirely and accordingly servicing the emergency current supply is obviated. As a side effect, the permanent magnet relieves the electromagnet during normal production. Accordingly this does not have to be energized with such a high current The output power of the normal current supply to the electromagnet can be made smaller. This affects the DC voltage source, the power output of the controller and the cable cross-sections through the machine.

The permanent magnet is advantageously so designed that the braking moment which can be created by it alone amounts to about 50% of the maximum braking moment. The electromagnet then only has to create the difference in magnetic flux which is needed to attain the specific braking moment. If less than the average braking moment is required, then the electromagnet operates with reverse polarity to the permanent magnet. If a braking moment between 50% and 100% is required, the electromagnet strengthens the magnetic flux of the permanent magnet through corresponding polarity. In normal operation of the textile machine the braking moment is therefore created by the magnetic fluxes of the two magnets. The adjustment of the required braking moment is effected by opposing or adding together the magnetic fluxes of the permanent magnet and the electromagnet. Only when current is lost and the textile machine correspondingly stops is the braking moment determined solely by the permanent magnet.

BRIEF DESCRIPTION OF THE DRAWINGS

The invention is explained in more detail below with reference to embodiments shown in the drawings, in which.

DETAILED DESCRIPTION

There are planar systems of hysteresis brakes, in which the magnetic flux is passed through a hysteresis disc largely parallel to the axis, and radial systems, in which the magnetic flux traverses the hysteresis ring in the radial direction. The invention is explained with reference to two embodiments which operate according to the radial system.

Figure 3:
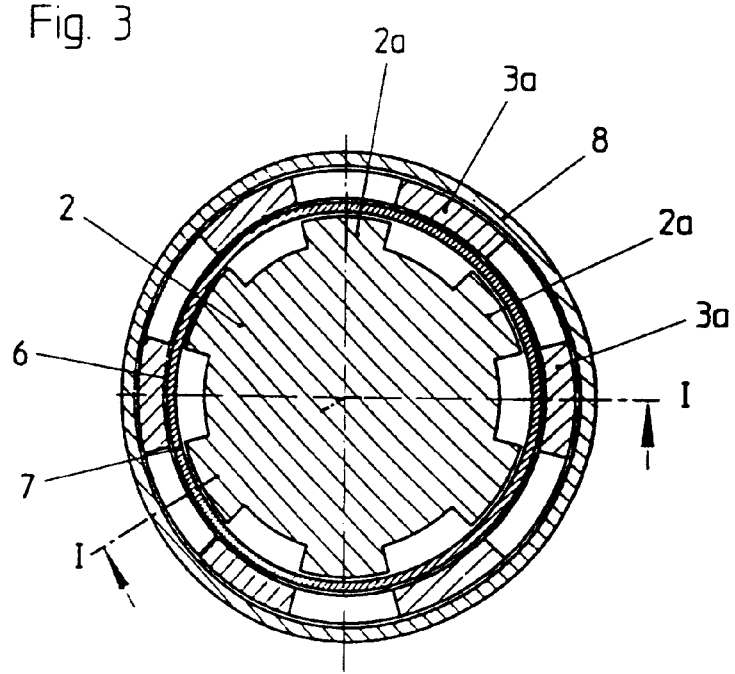
FIG. 3 is a radial section according to the line III—III of FIG. 1.

The hysteresis brake consists firstly of a stationary or fixed brake magnet 1, which comprises an inner pole ring part 2 and an outer pole ring part 3. The inner pole ring part 2 carries a magnet winding 4, which is surrounded by an annular permanent magnet 5. The inner pole ring part 2 has poles 2a which are offset in the circumferential direction relative to the poles 3a of the outer pole ring part 3, as can be seen from FIG. 3. In between the poles 2a of the inner pole ring part 2 and the poles 3a of the outer pole ring part 3 there is provided an annular air-gap 6. The hysteresis ring 7 of permanent magnetic material dips into this air-gap 6. The hysteresis ring 7 is carried by an armature 8, which is rotatable relative to the permanent magnet 1 on a journal 10 of the inner pole ring part 2, through the ball bearings 9. The armature 8 is connected to the part to be braked, especially a roller or the like, which is wrapped round by the yarn to be braked. The roller is not shown in the drawings.

A DC voltage source is connected to the magnet winding 4 through a line 11. The current strength can be regulated via a controller 15, and the current direction can be set by suitable poling.

The pennanent magnet 5 is advantageously so designed that the braking moment which can be created by it alone amounts to about 50% of the maximum braking moment.

Figure 1:
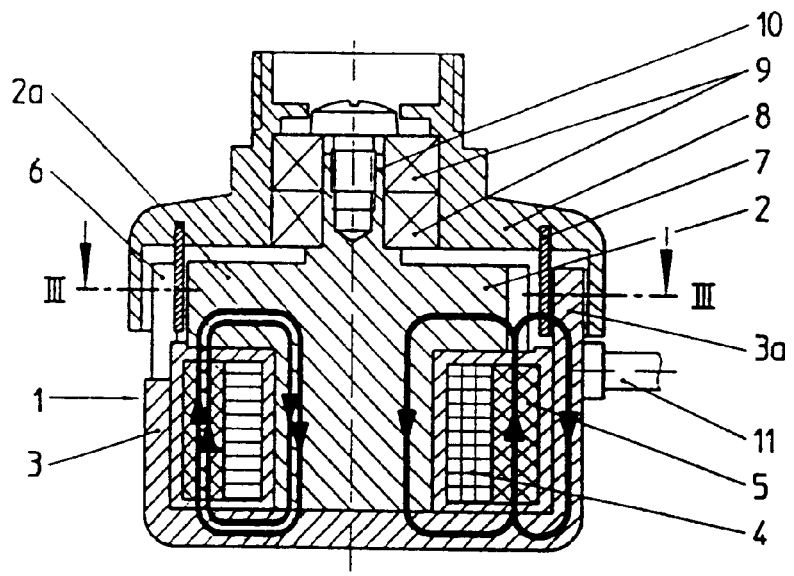
FIG. 1 is an axial section of a first embodiment of the hysteresis brake according to the line I—I of FIG. 3.
Figure 2:
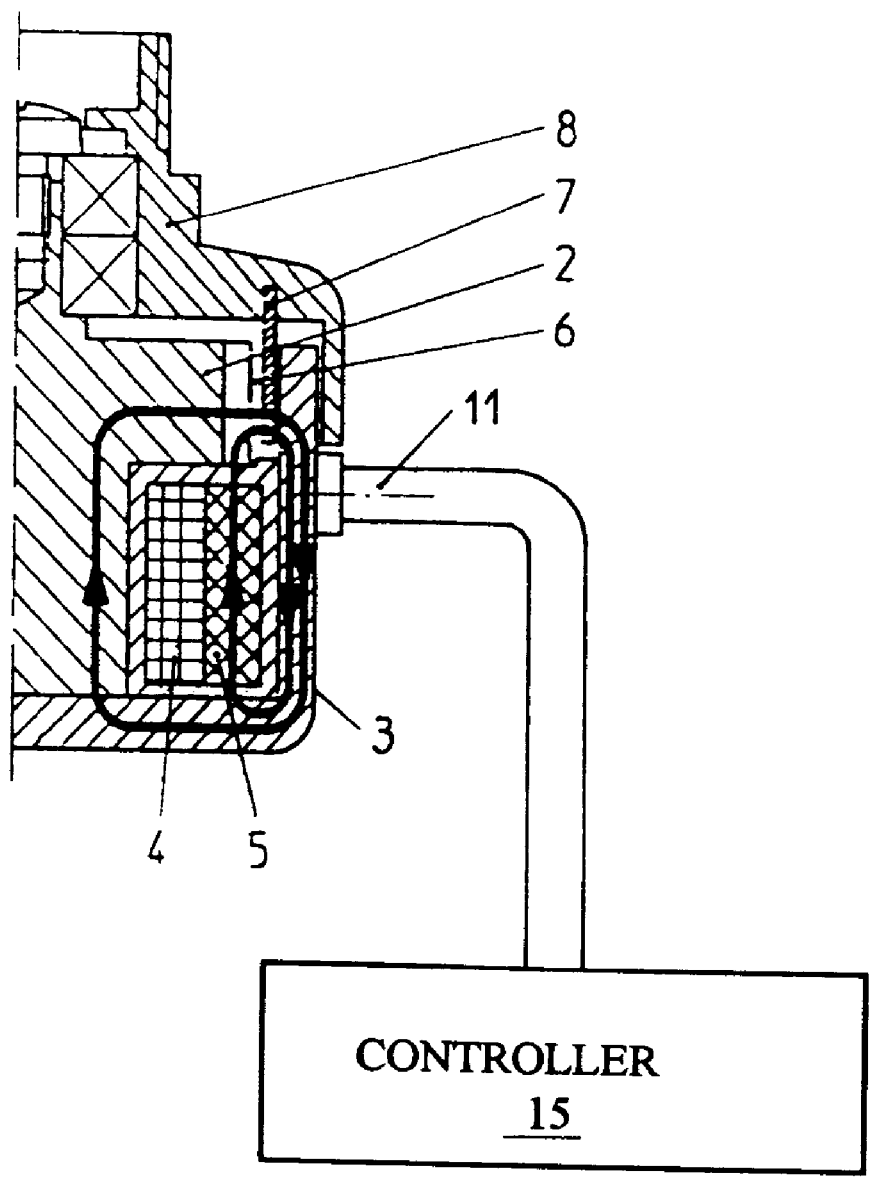
FIG. 2 is a partial axial section of this embodiment.
Figure 4:
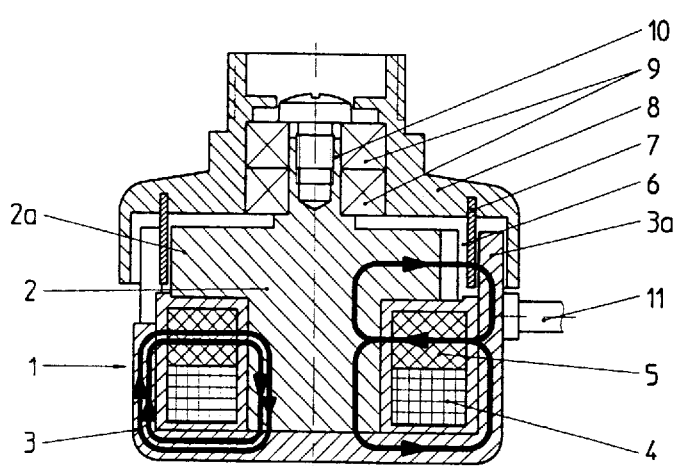
FIG. 4 is an axial section of a second embodiment.
Figure 5:
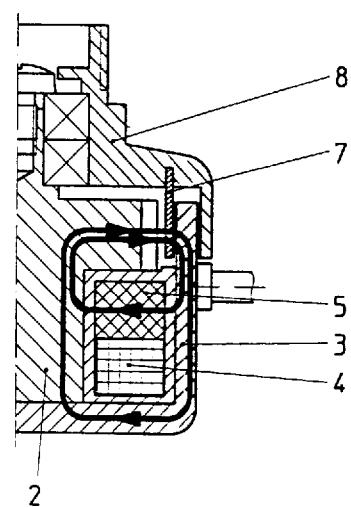
FIG. 5 is a partial axial section of this embodiment.

The magnetic flux lines are indicated by thick black lines in FIGS. 1 and 2 and also in FIGS. 4 and 5 of the drawings in various operating states of the hysteresis brake.

If an average braking moment of about 50% of the maximum braking moment is required, the magnet winding 4 is not energized. A magnetic flux is created by the permanent magnet 5 which runs according to FIG. 1, right, partially through the air-gap 6 and partially through the inner pole ring part 2 and the outer pole ring part 3. If a braking moment less than 50% is to be achieved, the magnet winding 4 is switched on and with such a polarity that the magnetic flux of the magnet winding 4 counteracts the magnetic flux of the permanent magnet 5. The greater the current strength, the smaller is the total magnetic flux passing through the air-gap 6. According to FIG. 1, left, the permanent magnet 5 acts inversely on the electromagnet 4 and as a result there is hardly any magnet flux in the air-gap 6. The braking moment exerted by the hysteresis ring 7 on the armature 8 is thus equal to zero. If on the other hand more than 50% braking moment is required, this can be achieved by reversing the polarity of the magnet winding 4 and by regulation of the current strength. The magnet flux of the electromagnet 4 now occurs through the air-gap 6 in the same direction as the magnet flux of the permanent magnet 5, so that the effects of the two magnet fluxes are added together as seen in FIG. 2. The higher the current strength is set in the electromagnet 4, the greater is the braking moment exerted on the armature 8. The electromagnet 4 is assisted by the permanent magnet 5 and has to create practically only 50% of the maximum torque.

The embodiment shown in FIGS. 4 and 5 differs from the previously described embodiment only in the arrangement of the permanent magnet 5 and the magnet winding 4 relative to one another. In the embodiment shown in FIG. 4 the magnet winding 4 of the electromagnet and the permanent magnet 5 are arranged axially behind one another, the permanent magnet 5 being adjacent the hysteresis ring 7. The construction of the hysteresis brake and the manner of operation are otherwise the same as in the previously described embodiment, so that the same reference numerals have been used for parts with the same function and the previous description also applies in general to the embodiment shown in FIGS. 4 and 5.

What is claimed is:

1. An electromagnetic hysteresis brake, said hysteresis brake having; a stationary brake magnet having an inner pole ring; an outer pole ring that surrounds said inner pole ring so as to define an annular air gap between said pole rings; a magnetic winding that extends around said inner pole ring; and a rotating armature that is rotatingly mounted to said inner pole ring, said armature including a hysteresis ring of permanent magnetic material, wherein said hysteresis ring projects into the air-gap wherein: at least one permanent magnet extends circumferentially around said inner pole ring and is located adjacent said magnetic winding so that a magnetic flux extends circumferentially through the air gap and the magnetic flux is a combination of a magnetic flux of said magnetic winding and a magnetic flux of said permanent magnet.

2. The hysteresis brake of claim 1, wherein: the magnetic flux in the air gap creates a braking moment and said hysteresis brake has a maximum braking moment; and said permanent magnet is so designed that the braking moment which is created by said permanent magnet alone amounts to about 50% of the maximum braking moment.

3. The hysteresis brake of claim 1, wherein said magnetic winding is disposed concentrically within said permanent magnet.

4. The hysteresis brake of claim 1, wherein: said armature defines a center axis that extends through said inner pole ring; and said magnetic winding and said permanent magnet are arranged longitudinally along the center axis.

5. The hysteresis brake of claim 4, wherein said magnetic winding and said permanent magnet arranged on said inner pole ring so that said permanent magnet is adjacent to said armature and said magnetic winding is distal from said armature.

6. The hysteresis brake of claim 1, further including a control unit connected to said magnetic winding for selectively applying a variable DC voltage to said magnetic winding in a forward polarity or a reverse polarity so that, depending on the polarity of the voltage applied to said magnetic winding, said magnetic winding and said permanent magnet produce a variable magnetic flux to selectively establish a variable braking moment that is applied to said hysteresis ring.

7. An electromagnetic hysteresis brake, said hysteresis brake including:

an inner pole ring having a head end;

an outer pole ring that extends around said inner pole ring, said outer pole ring having an annular head end that extends around the head end of said inner pole ring and is spaced away from the head end of said inner pole ring so as to define an annular air-gap between said inner and outer pole rings;

a annularly shaped permanent magnet fitted to said inner pole ring so as to extend around said inner pole ring, said permanent magnet having a magnetic flux that extends across the air gap;

a magnetic winding fitted to said inner pole ring so as extend around said inner pole ring;

an armature that is rotatably fitted to the head end of said inner pole ring;

a hysteresis ring formed of magnetic material that is fitted to said armature to rotate in unison with said armature, said hysteresis ring being shaped to extend into the air gap; and a control unit connected to said magnetic winding for applying a voltage to said magnetic winding so that said magnetic winding produces a magnetic flux and the magnetic flux in the air gap is a combination of the magnetic flux produces by said permanent magnet and the magnetic flux produced by said magnetic winding wherein said control unit selectively applies the voltage to said magnetic winding in a forward direction or a reverse direction so that the magnetic flux produced by said magnet winding selectively adds to or subtracts from the magnetic flux said permanent magnet produces in the air gap.

8. The hysteresis brake of claim 7, wherein:

the combined magnetic flux produced by said magnetic winding and said permanent magnet produces a braking moment on said hysteresis ring and said magnetic winding and said permanent magnet are collectively capable of producing a maximum braking moment; and said permanent magnet alone is configured to produce a magnetic flux that comprises 50% of the maximum braking moment.

9. The hysteresis brake of claim 7, wherein said permanent magnet and said magnetic winding are aligned so as to be coplanar.

10. The hysteresis brake of claim 9, wherein, relative to a center axis of said inner pole ring, said magnetic winding is located proximal to the center axis and said permanent magnet is located distal from the center axis.

11. The hysteresis brake of claim 7, wherein:

said armature rotates around a center axis that extends through said the inner pole ring; and said permanent magnet and said magnetic winding are arranged longitudinally to each other relative to the center axis of said armature.

12. The hysteresis brake of claim 11, wherein said permanent magnet is located proximal to the head end of said inner pole ring and said magnetic winding is located distal from the head end of said inner pole ring.

13. A method of regulating a braking moment produced by a hysteresis brake, said method including the steps of:

providing a hysteresis brake, said method including:

an inner pole ring and an outer pole ring that extends around the inner pole ring, the outer pole ring having an annular head end that extends around the inner pole ring and is spaced away from the inner pole ring so as to define an annular air-gap between the inner and outer pole rings;

an armature that is rotatably fitted to the inner pole ring, the armature having a hysteresis ring formed of magnetic material that is fitted to the armature to rotate in unison with the armature, the hysteresis ring being shaped to extend into the air gap;

a permanent magnet fitted to the inner pole ring so as to extend around the inner pole ring, the permanent magnet producing a magnetic flux that exends across the air gap so as to produce a braking moment that acts on the hysteresis ring; and a magnetic winding fitted to said inner pole ring so as to extend around said inner pole ring; and selectively applying a DC voltage to the magnet winding so that:

when the DC voltage is applied to the magnetic winding in a first direction, the magnetic winding produces a magnetic flux that counteracts the magnetic flux produced by the permanent magnet so that the braking moment that acts on the hysteresis ring is less than the braking moment produced by the permanent magnet alone; and when the DC voltage is applied to the magnetic winding in a second direction opposite the first direction, the magnetic winding produces a magnetic flux that supplements the magnetic flux produced by the permanent magnet so that the braking moment that acts on the hysteresis ring is greater than the braking moment produced by the permanent magnet alone.

14. The method of regulating the braking moment produced by a hysteresis brake of claim 13, wherein:

the permanent magnet and the magnetic winding are collectively configured so that when a select DC voltage is applied to the magnetic winding in the second direction, a maximum braking moment is produced; and in said step of providing the hysteresis brake, the permanent magnet that is part of the hysteresis brake is provided that produces a magnetic flux in the air gap that is 50% of the maximum braking moment.

15. The method of regulating the braking moment produced by a hysteresis brake of claim 13, wherein, in said step of providing the hysteresis brake, the permanent magnet that is part of the hysteresis brake is provided that has an annular shape and extends circumferentially around the inner pole ring.

16. The method of regulating the braking moment produced by a hysteresis brake of claim 13, wherein, in said step of providing a hysteresis brake, the permanent magnet and the magnetic winding are fitted to the inner pole ring so that, relative to a center axis that extends through the armature and the inner pole ring, the permanent magnet is located distal from the center axis and the magnetic winding is located proximal to the center axis.

17. The method of regulating the braking moment produced by a hysteresis brake of claim 16, wherein, in said step of providing the hysteresis brake, the permanent magnet that is part of the hysteresis brake is provided that has an annular shape and extends circumferentially around the inner pole ring.

18. The method of regulating the braking moment produced by a hysteresis brake of claim 13, wherein, in said step of providing the hysteresis brake, the permanent magnet and the magnetic winding are fitted to the inner pole ring so that the permanent magnet is located proximal to the air gap and the magnetic winding is located distal from the air gap.

19. The method of regulating the braking moment produced by a hysteresis brake of claim 18, wherein, in said step of providing the hysteresis brake, the permanent magnet that is part of the hysteresis brake is provided that has an annular shape and extends circumferentially around the inner pole ring.

20. The method of regulating the braking moment produced by a hysteresis brake of claim 18, wherein, in said step of providing the hysteresis brake, the magnetic winding that is part of the hysteresis brake is provided that has an annular shape and extends circumferentially around the inner pole ring.

* * * * *